Feb. 1, 1949.  R. C. JOHNSTON  2,460,507
ADJUSTABLE MULTICOLORED LIGHT FILTER

Filed Oct. 25, 1944  4 Sheets-Sheet 1

INVENTOR.
ROBERT C. JOHNSTON

BY
Rodney C. Southworth
ATTORNEYS

Feb. 1, 1949.    R. C. JOHNSTON    2,460,507
ADJUSTABLE MULTICOLORED LIGHT FILTER
Filed Oct. 25, 1944    4 Sheets-Sheet 2

INVENTOR.
ROBERT C. JOHNSTON
BY
ATTORNEYS

Feb. 1, 1949.  R. C. JOHNSTON  2,460,507
ADJUSTABLE MULTICOLORED LIGHT FILTER
Filed Oct. 25, 1944  4 Sheets-Sheet 3

INVENTOR.
ROBERT C. JOHNSTON
BY
Rodney C. Southworth
ATTORNEYS

Feb. 1, 1949.   R. C. JOHNSTON   2,460,507
ADJUSTABLE MULTICOLORED LIGHT FILTER
Filed Oct. 25, 1944   4 Sheets-Sheet 4
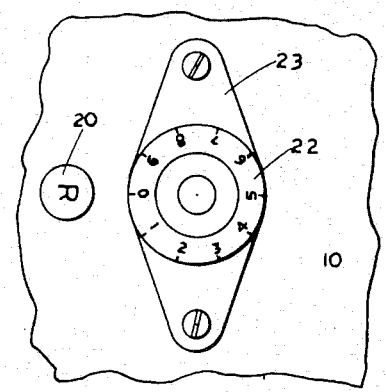
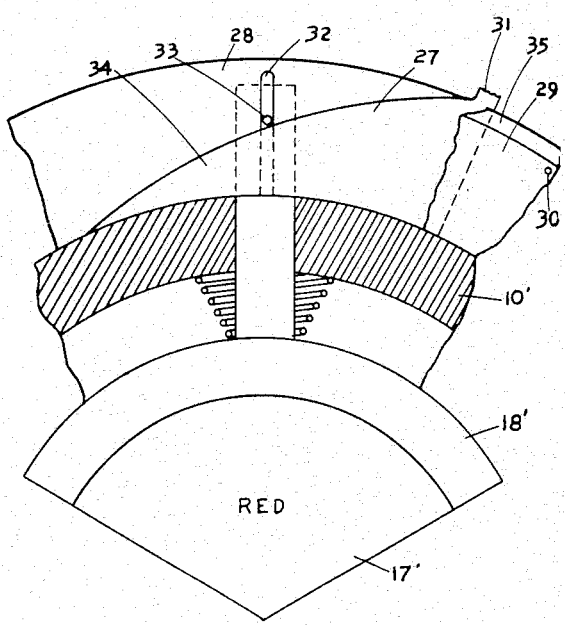
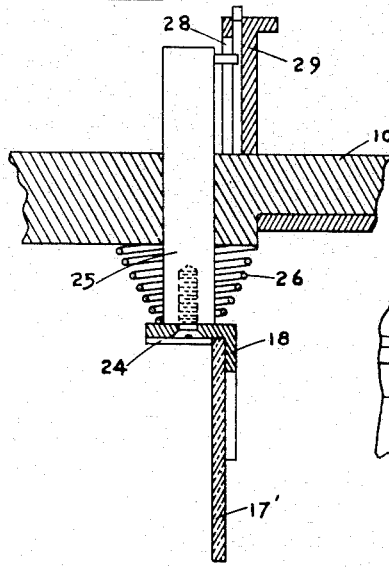
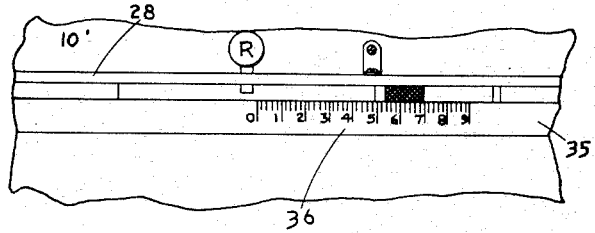
INVENTOR.
ROBERT C. JOHNSTON
BY
Rodney C. Southworth
ATTORNEYS Patented Feb. 1, 1949

2,460,507

UNITED STATES PATENT OFFICE 2,460,507

ADJUSTABLE MULTICOLORED LIGHT FILTER

Robert C. Johnston, Binghamton, N. Y., assignor to General Aniline & Film Corporation, New York, N. Y., a corporation of Delaware Application October 25, 1944, Serial No. 560,366

1 Claim. (Cl. 95—81.5)

This invention pertains to multi-colored filters and their application to photographic objectives. In the projection of colored pictures, it is frequently necessary to compensate for certain inaccuracies in the color rendering of the picture, either a negative or positive transparency or the like. Multi-colored filters have been employed and it has been suggested that the objective be provided with a filter of that type and that the differently colored filter strips be adjustable, or that special diaphragms or masking means be provided so as to regulate the effect of the one or more of the independently colored filter elements.

While it is not always essential, it is highly desirable that such a multi-colored filter be placed between the elements of a photographic objective, the preferred position being at the nodal point, see U. S. Patent No. 2,354,108. In projection of colored transparencies, especially when enlarging or copying, it is frequently desirable that the objective be stopped down in which event the usual strip filters become relatively ineffective since at smaller stops or apertures, the central colored elements predominate while those at the outer part of the lens become relatively or totally ineffective. Of course, it is obvious that with filters and diaphragm means such as have been employed and as have been described above, a lens cannot be used at other than its full aperture, or if so used, the filter and color control becomes relatively ineffective. Special filters have been suggested as in U. S. Patent No. 2,107,116, but these are expensive, difficult to produce and for different effects a different filter must be employed.

Accordingly, it is an object of this invention to provide a multi-colored filter which may be employed between the elements of and at the nodal point of an objective if desired, and which shall be useful in maintaining color balance, or in varying the original color rendering of a transparency to be projected at any and all aperture settings. It is also an object of this invention to provide a very simple construction and one which shall be easily adjusted or set at the desired points, and which also may be returned to any particular setting after having been employed at some other position. It is also an object of the invention to provide a construction which, while primarily intended for use within the lens barrel or other lens mounting, shall be of compact construction and thereby will be capable of being used in that mounting without unnecessarily enlarging it.

Other objects of the invention will become apparent as this disclosure proceeds. The invention is to be described by reference to one specific form which the same may take and a modification thereof, the same being illustrated in the accompanying figures of drawing in which:

Fig. 4 is a fragmentary view of the micrometer adjusting means.

Fig. 5 is a section through part of the lens mounting showing one of the colored filter elements and a modified form of adjusting and positioning means therefor.

Fig. 6 is a section taken longitudinally of Fig. 5.

Fig. 7 is a fragmentary view showing further details of that modified form of the invention.

Figure 1:
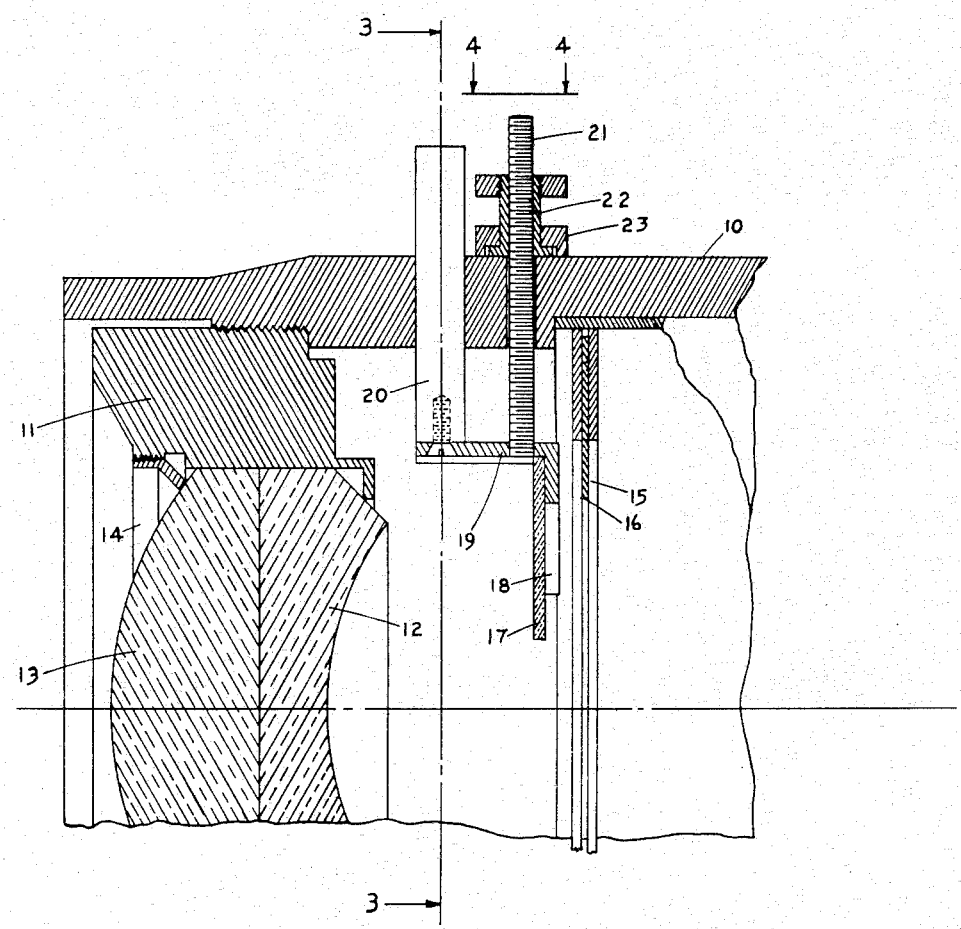
Fig. 1 is a section through part of an objective in which a diaphragm, a filter and filter mounting have been illustrated.

Referring to Fig. 1, part of the photographic objective has been illustrated, this objective being of a type employed for projection of photographic images such as negative or positive color transparencies. It is to be understood that the invention is by no means limited to objectives for that particular purpose but is useful in all types of copying, printing, projecting, and enlarging or other lenses, and it is also fully capable of being used with objectives for taking colored pictures. Hereinafter, and in the claims, when the term "photographic objective" is employed, it is to be understood as including all such lenses or combinations of lenses, whether used for taking pictures or for projection work.

The invention will be described by reference to a form thereof in which a tri-colored filter is used, but it is to be understood that it is applicable to two or more colors. The colors normally employed are the primary colors, but it is to be understood that the components of the light passing through an objective may be altered in any desired manner and by the interposition of filters adapted to affect that light in any desired manner. Preferably, the filters, when moved to a position to affect the light to the greatest extent possible, will block off the entire lens aperture and will interpose equal areas of each independent filter. However, it is not essential that the areas of each filter be equal, and it may, in some instances, be more desirable to use filter sectors which leave a certain amount of unfiltered area through which the projecting light may pass even though each of the filters at that time has its maximum effect.

The figures of drawing show to a rather enlarged scale a typical objective having a barrel or lens mounting 10, which is threaded at its front end to receive a seat 11, in which are clamped components 12 and 13 of the objective. A clamping ring 14, serves to maintain these elements in place. At the opposite end of the objective, other lens components would be similarly held in position, but they are not illustrated here since the number of components within the lens, the manner in which they are mounted and their particular curvature do not form a critical part of the instant invention.

Normally, the nodal point, or the rear nodal point, of an objective occurs at some position between the components. That is the assumption in this instance, but in the event that point does not occur within the objective itself, that is, between the components at opposite ends of the lens, the filter will preferably be positioned at that point wherever it may be located.

It is not to be understood that the invention is utilized or is intended for use only at the nodal point of a lens since it may be employed at any position in which it can be used to advantage. Better results are generally to be had at the preferred position.

The objective therein shown has a diaphragm 15, of conventional type, there being a plurality of blades 16, which go to make up the usual iris construction. Of course, these blades are controlled by an appropriate projecting lever or by a diaphragm setting ring, such as are commonly employed.

Figure 2:
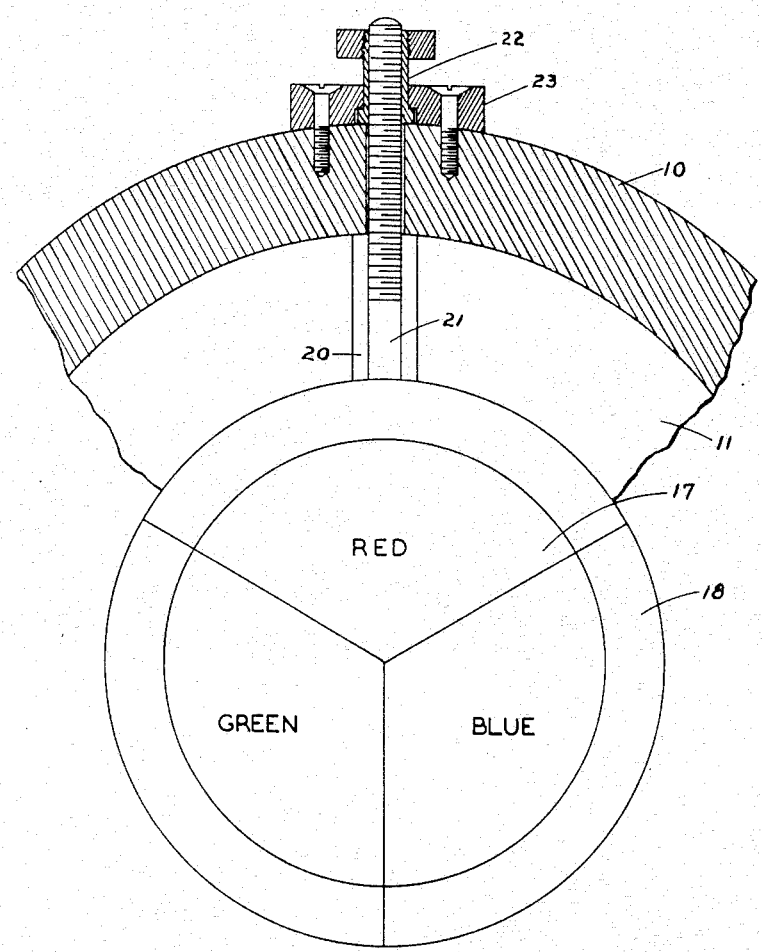
Fig. 2 is a cross section through Fig. 1, taken through the filter adjusting screw and facing toward the front of the objective.
Figure 3:
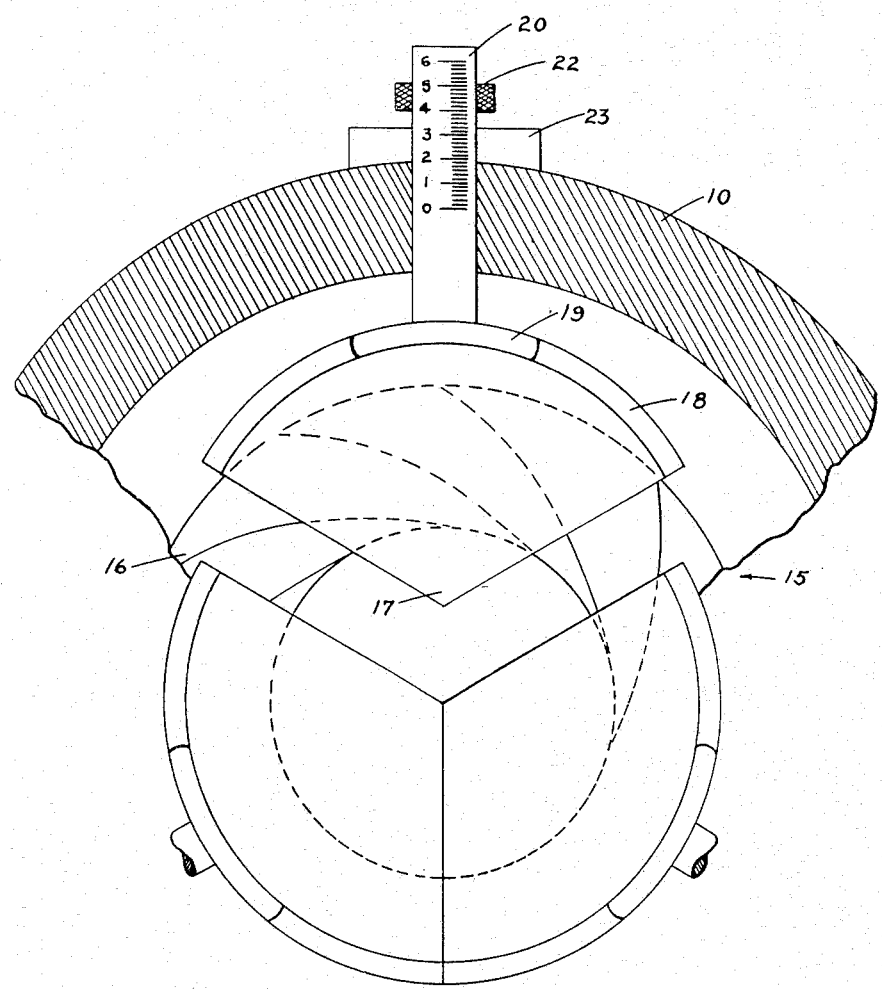
Fig. 3 is a similar section, but taken looking in the opposite direction.

Still referring to Fig. 1, and also to Figs. 2 and 3, there are three similarly shaped sectors, each of which extends throughout 120° of arc and each of which, when moved to innermost position, will close off one third of the opening through which light may pass as determined by that stop at which the diaphragm is set. Except for its color, each of these filter sectors is practically identical with the other, and a description of one will suffice to acquaint those skilled in the art with the physical details thereof and with the mode of operation of the device. A filter sector 17 may be held by clamping, but preferably by cementing at its outer periphery within a filter supporting flange 18, equal in length to the arc of the filter and from which projects at right angles a supporting arm or holder 19. This arm 19 is fixedly connected to a slide 20, which is held to be guided radially of the lens barrel within a bearing in that element. The slide 20 has a working fit in its bearing, but there should be no appreciable play. A threaded shaft or spindle 21 is connected at the opposite end of arm 19, that is, adjacent the filter supporting flange. That spindle 21 extends outwardly and in a radial direction parallel to the slide 20. A clearance hole is provided in the barrel 10 and a knurled thumb nut 22 serves to adjust or move that spindle radially toward or from the axis of the objective in a manner presently to be described.

Adjusting nut 22 has a collar or shoulder at its lower end which fits within a cooperating recess in a retaining member 23. The parts just described are so machined that there is no appreciable radial movement, nor is there any axial play between the thumb nut and the retaining member or outside surface of barrel 10 which is machined to a flat at that particular point. For obvious reasons, the thumb nut is made in two pieces and the knurled ring at the top may be held in position by a set screw, pin, or any other of the usual expedients.

As shown in Fig. 3, the slide 20 is indexed and carries a scale at one side. That scale is read with the outside surface of the barrel 10 as a reference point. The thumb nut 22 is also graduated, Fig. 4, and the scale on that thumb nut is read in conjunction with that on the slide so that, in fact, the two provide a micrometer type adjustment. Depending upon the fineness of the threads on spindle 21, the adjustment can be made more or less critical.

Movement of the filter is maintained within a radial direction by means of slide 20 which is prevented from turning within its bearing since the spindle 21 is held more or less rigidly to a parallel, radial movement, due to the effect between the thumb nut, collar, holder 23, and the accurate and fine threading between the nut and spindle.

Of course, the colored filter elements may be observed through the lens, but to facilitate use, some indicating device is preferably employed. According to one preferred construction appropriate lettering or wording may be used in conjunction with each filter thereby indicating the color which is controlled by each independent adjustment means. Of course, one adjusting means such as has been described above must be provided for each of the independent filtered elements. Here, the letters B, G, and R stamped at the ends of the slides 20, indicate the corresponding colors, blue, green, and red for the filters. Such indicia may be displayed at any point convenient to the adjustment means, and in the event the lens is to be employed in partial or total darkness, it is contemplated that there shall be a distinctive shape given to some one of the elements so that the operator thereof may make adjustment for any color desired without resort to other than the sense of touch. To that end, the outer surface of each of the slides may be given a different geometrical shape so that element, or any other of the elements so formed, may be distinguished by touch.

When adjusted inwardly to innermost position the filter sector point should theoretically just reach the axis or longitudinal center line of the objective. Of course, it is preferable that reasonable tolerances be maintained, and since it is most unlikely that the sectors are ever to be used to block off exactly one third of the area of the lens pupil, it is not necessary to provide for that extreme movement. Normally, the adjustment outwardly must provide for withdrawing the sector far enough so that it can have no effect whatsoever when the lens is used at full aperture. At that time, the arm 19 may move up against the inner surface of the lens barrel.

In actual operation of the mechanism, for example, when projecting or enlarging a color transparency, a minimum area of each of the filters should be employed initially. Perhaps one of the filters will be inserted to a slight extent if it appears likely that the transparency is too strong in a color complementary to that of the filter. Upon projecting, or upon finishing the enlarged or other picture, it may be found that more color correction is necessary. Then further setting of the filter sectors may cut down transmission of any particular component or components of the light such as appears to be in excess of that required for producing the most accurate or the desired color rendering.

The graduations on the slide and on the thumb nut may be recorded for each or any transparency, and if that particular transparency is to be projected again, the filter setting originally determined makes it possible to duplicate the original results at once. Of course, the diaphragm setting must also be tabulated and is a necessary part of the required data incidental to successful projection.

It is contemplated that tables may be prepared for showing relationship between diaphragm settings and filter settings. For example, data may be calculated or determined experimentally so that proper settings of the filters for projecting a transparency at one particular aperture may be translated into equivalent settings to be used for other stops. Due to the shape of the filter elements and their precise radial movement within the lens, or at the nodal point, control of the color components of the light may be as effectively exercised at all stops. Instead of the tabulation as above described, a special slide rule or other mechanical type calculator may be employed.

Now referring to Figs. 5, 6, and 7, a modification is shown in which a simplified mechanism has been developed for moving the filters to and from their central position. Here a filter 17' held in a flange 18' may move radially within an objective or lens barrel 10'. The filter retaining flange has an arm or extension 24 by means of which it is fixedly attached to a slide 25. This slide is guided within a bearing in the lens barrel or other support and, normally, a spring 26, under compression, urges the filter inwardly toward the lens axis.

Control of each of the filters, there being a plurality although only one is illustrated in these figures, is by a corresponding number of sliding wedges, one of which is shown at 27. These wedges are held between rings 28 and 29. The space between rings is sufficient to allow the wedge 27 to be moved, but since each of the wedges is tensioned or bent slightly, it will flex between the rings which are held together by a series of pins or rivets 30. The amount of tensioning can be varied so that each of the wedges may move relatively freely, yet will remain in that position at which it is set. Each wedge has a projection 31 knurled for engagement by the operator's thumb or finger.

The ring 28 is slotted as shown at 32, and a pin 33 projecting from the upper end of slide 25 extends through the slot and rests upon the cam surface 34 on the wedge. That pin is of such length that it does not contact or rub against the inner face of the ring 29. The cooperating engagement between the pin and slot prevents turning of slide 25, thereby maintaining the filter at right angles to the axis of the objective.

Ring 29 has an outer flange 35 which is graduated as shown at 36, Fig. 7. Those graduations may be of any convenient type for indicating the position of the filter controlled at that side of the lens mounting. Marking of the color controlled at each point is taken care of in a manner similar to that described with respect to the form of the invention disclosed above. The cam surface 34 may be more or less steep depending upon the amount of movement demanded by the filter sector, and upon the dimensions of the lens or fineness of adjustment desired. The graduations 36 may vary accordingly. The position of the pins or rivets 30 is such that a wedge will be stopped before its cam surface 34 passes entirely beyond cooperating pin 33. That prevents accidental displacement of any of the wedges, although they may be forcefully removed if desired. Instead of riding upon the cam surface 34, the pin 33 may engage within a slot in wedge 27. Then spring 26 would no longer be necessary.

The filter sectors may be of any suitable material, for example, glass in which properly colored pigment has been suspended, gelatin sandwiched between glass, or of other filter material known to those skilled in the art.

While the preferred use of the mechanism described herein is at the nodal point of a lens of better type which normally would comprise a greater number of lens components, it is adapted to use with all lenses, and is also to be employed at other than the nodal point of a lens.

While specific embodiments of the invention have been disclosed, it is to be understood that the inventive concept may be carried out in a number of ways. This application is, therefore, not to be limited to the precise details described but is intended to cover all variations and modifications thereof falling within the spirit of the invention and the scope of the claim.

I claim:

In an objective, the combination of lens mounting barrel, a plurality of lens components, a diaphragm and a multi-colored filter, said filter comprising a plurality of sector-shaped, differently colored filter elements, a support for each said element comprising a flange and an angularly directed arm and means attached to the arm of the support and extending radially outward of the objective for moving the support and filter including a slide, a bearing in the lens barrel in which said slide is guided, a threaded stem passing through the lens barrel connected to said arm and spaced from and projecting in a direction parallel with said slide, an adjusting nut threaded to the stem, means attached to the lens barrel for restraining said nut radially thereof and for preventing movement thereof axially with respect to the direction of spindle movement, a series of graduations on the slide and other graduations on the adjusting nut, and indicia associated with each of said filters for showing its respective color.

ROBERT C. JOHNSTON.

REFERENCES CITED

The following references are of record in the file of this patent:

UNITED STATES PATENTS

| Number | Name | Date |
|---|---|---|
| 536,493 | Wadsworth | Mar. 26, 1895 |
| 562,642 | McDonough | June 23, 1896 |
| 1,154,607 | Brasseur | Sept. 28, 1915 |
| 1,288,555 | Fritz | Dec. 24, 1918 |
| 1,749,802 | Culmer et al. | Mar. 11, 1930 |
| 1,852,743 | Elmer | Apr. 5, 1932 |
| 1,971,737 | Troland | Aug. 28, 1934 |
| 2,151,735 | Bresser | Mar. 28, 1939 |
| 2,325,350 | West | July 27, 1943 |

FOREIGN PATENTS

| Number | Country | Date |
|---|---|---|
| 4,914 | Great Britain | 1907 |
| 67,726 | Austria | Jan. 25, 1915 |
| 251,018 | Great Britain | Apr. 22, 1926 |
| 282,253 | Great Britain | Dec. 22, 1927 |
| 320,101 | Great Britain | Oct. 2, 1929 |
| 402,897 | Great Britain | Dec. 14, 1933 |